(12) United States Patent
Fidalgo et al.

(10) Patent No.: US 6,448,638 B1
(45) Date of Patent: Sep. 10, 2002

(54) INTEGRATED CIRCUIT CONTACT CARD, COMPRISING A DETACHABLE MINICARD

(75) Inventors: Jean-Christophe Fidalgo, Gemenos; Nicolas Housse, Saint Zacharie, both of (FR)

(73) Assignee: Gemplus, Gemenos (FR)

( * ) Notice: Subject to any disclaimer, the term of this patent is extended or adjusted under 35 U.S.C. 154(b) by 0 days.

(21) Appl. No.: 09/600,706

(22) PCT Filed: Jan. 14, 1999

(86) PCT No.: PCT/FR99/00052

§ 371 (c)(1),
(2), (4) Date: Jul. 21, 2000

(87) PCT Pub. No.: WO99/38118

PCT Pub. Date: Jul. 29, 1999

(30) Foreign Application Priority Data

Jan. 22, 1998 (FR) .............................. 98/01370

(51) Int. Cl.[7] ...................... G06K 19/077; G06K 19/00; H01R 43/00; B42D 15/00

(52) U.S. Cl. ................ 257/679; 257/680; 257/774; 257/727; 235/492; 235/380; 235/487; 235/486; 361/401; 361/752; 361/759; 29/827; 283/83

(58) Field of Search ................ 257/679, 680, 257/774, 726, 725, 727, 729, 730; 235/492, 380, 487, 486; 361/401, 752, 759; 29/827; 238/83

(56) References Cited

U.S. PATENT DOCUMENTS

| | | | | |
|---|---|---|---|---|
| 4,822,988 A | * | 4/1989 | Gloton | 361/401 |
| 5,601,489 A | * | 2/1997 | Komaki | 463/44 |
| 5,737,582 A | * | 4/1998 | Fukuzumi | 395/500 |
| 5,752,857 A | * | 5/1998 | Knights | 235/380 |
| 5,956,601 A | * | 9/1999 | Sato et al. | 438/458 |
| 6,085,412 A | * | 7/2000 | Iwasaki | 29/827 |
| 6,264,506 B1 | * | 7/2001 | Yasufuku et al. | 439/638 |

FOREIGN PATENT DOCUMENTS

| | | | | |
|---|---|---|---|---|
| EP | 0521778 A1 | | 1/1993 | |
| EP | 0638873 A2 | | 2/1995 | |
| JP | 1-192590 | * | 8/1989 | 283/82 |
| JP | 2-292692 | * | 12/1990 | 235/375 |
| JP | 5-229292 | * | 9/1993 | |
| JP | 5-238182 | * | 9/1993 | 283/72 |
| JP | 8-22523 | * | 1/1996 | |
| JP | 3-55296 | * | 3/1996 | 283/83 |
| JP | 11-134466 | * | 5/1999 | |
| WO | 00/73988 A1 | * | 12/2000 | |
| WO | 01/88843 A2 | * | 11/2001 | |

* cited by examiner

Primary Examiner—Alexander O. Williams
(74) Attorney, Agent, or Firm—Burns, Doane, Swecker & Mathis, L.L.P.

(57) ABSTRACT

A standard size smart card has a flat support with a slot in the support to define the boundary of a minicard attached to the support by lugs. Each lug has two types of grooves opposite each other so they provide sufficient resistance to bending and flexing. One of the grooves is configured so it starts to crack when the minicard is purposely subject to pressure.

25 Claims, 5 Drawing Sheets

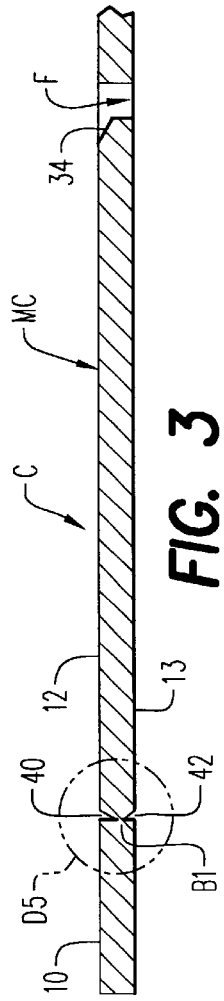
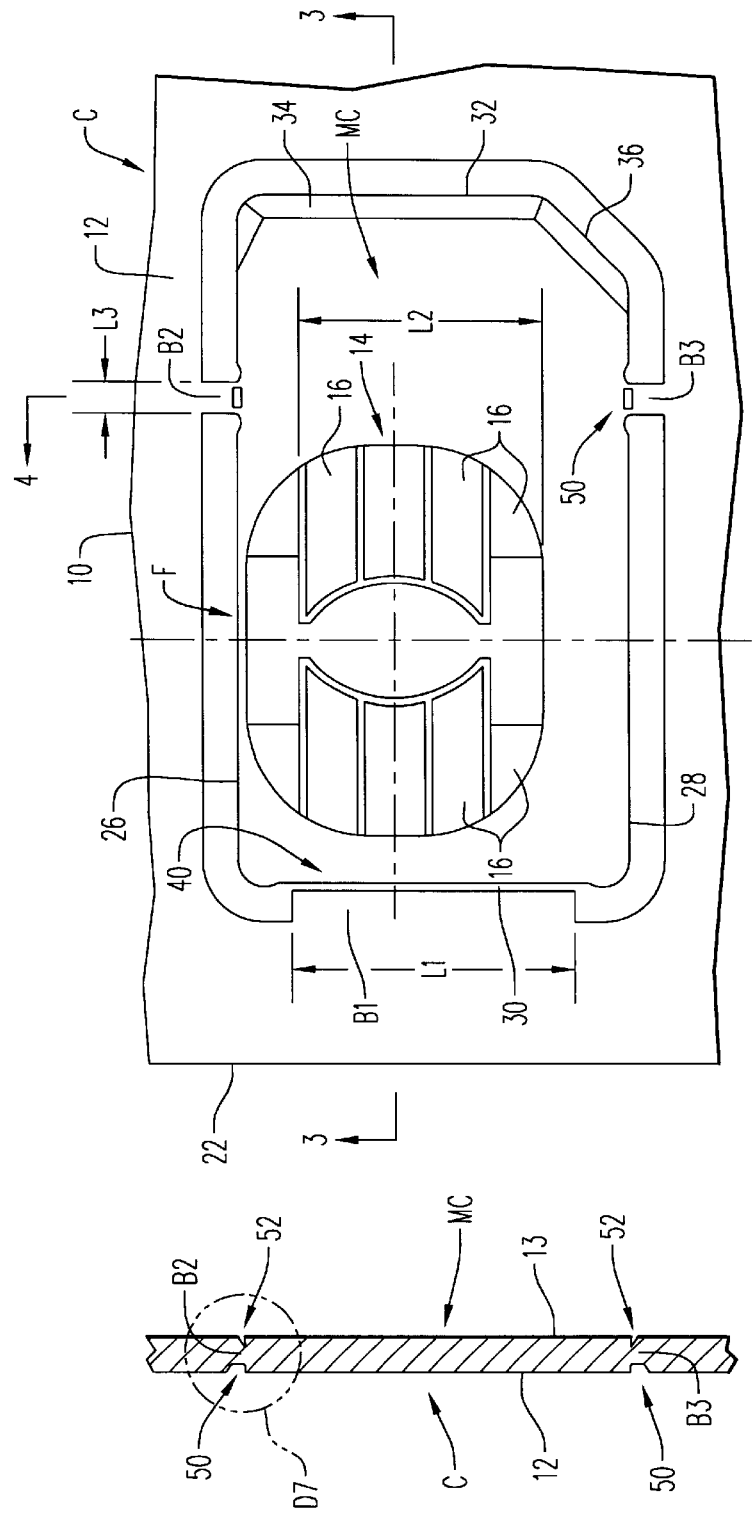
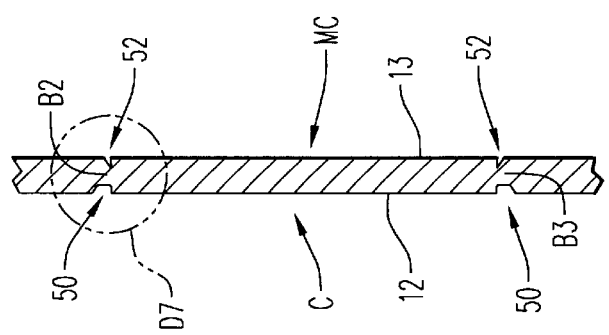
FIG. 3
FIG. 2
FIG. 4

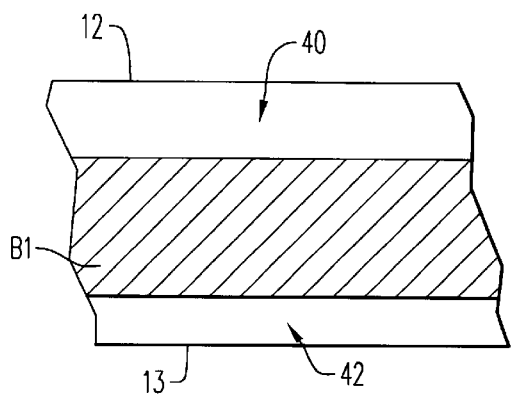
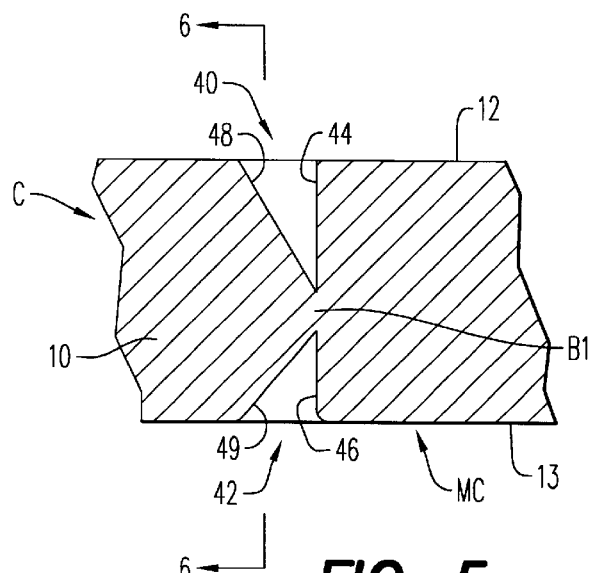
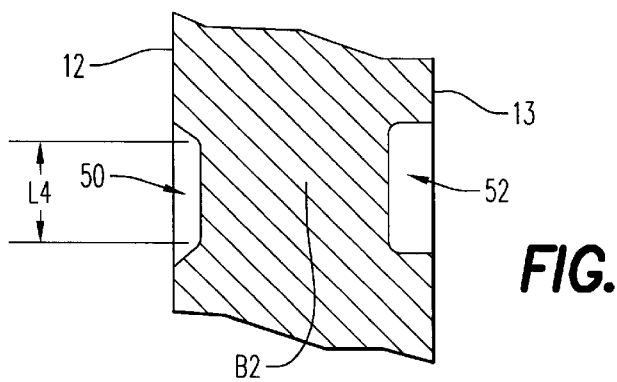
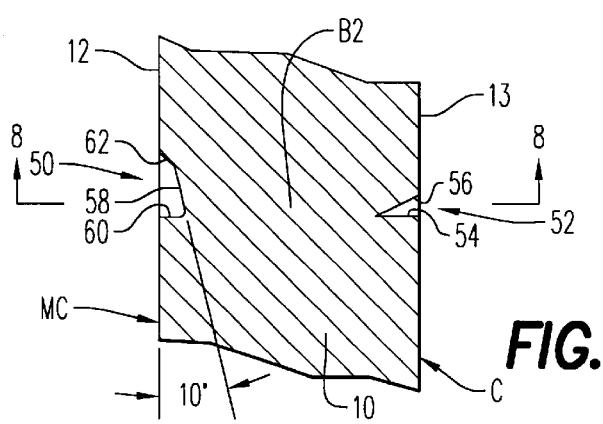
FIG. 6
FIG. 5
FIG. 8
FIG. 7

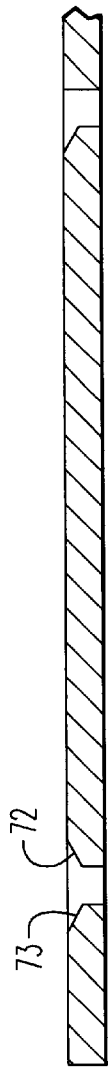
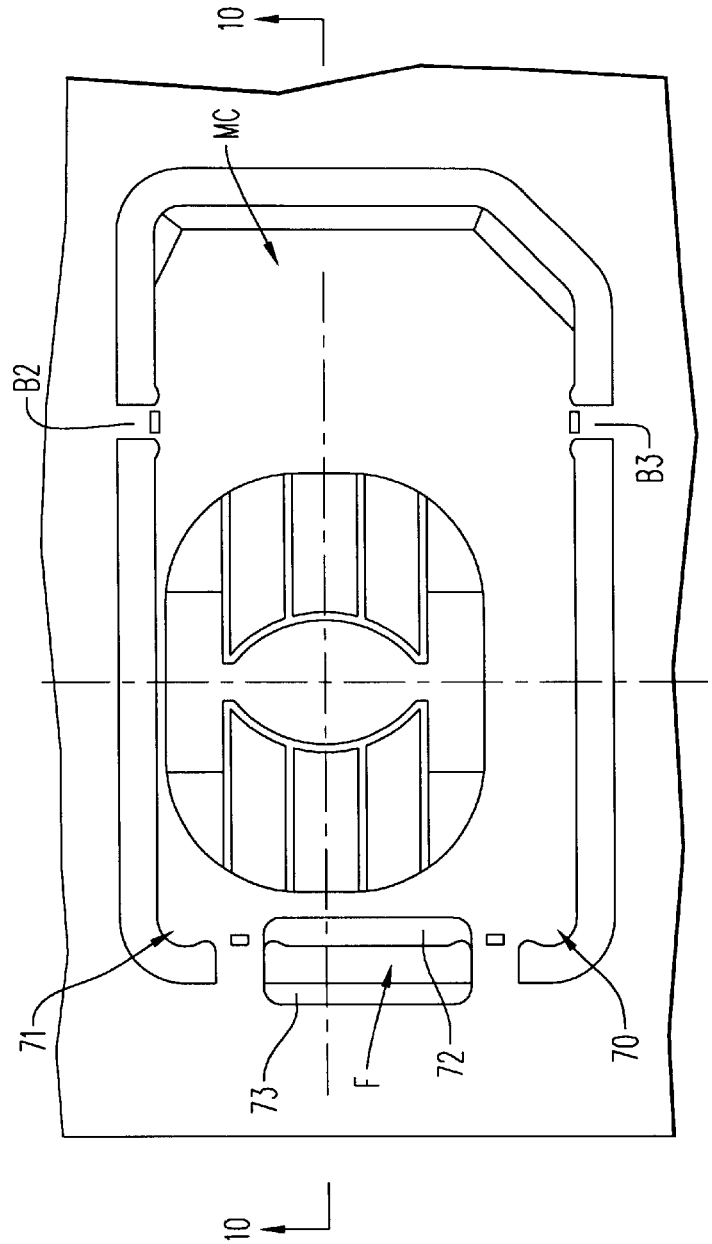

INTEGRATED CIRCUIT CONTACT CARD, COMPRISING A DETACHABLE MINICARD

This disclosure is based upon, and claims priority from, French Patent Application No. 98/01370, filed Jan. 22, 1998, and International Application No. PCT/FR99/00052, the contents of which are incorporated herein by reference.

BACKGROUND OF THE INVENTION

The present invention relates to a standardized integrated circuit contact card, also usually referred to as a smart card.

The invention more particularly relates to a standardized smart card which can be transformed irreversibly into a standardized mini smart card.

The invention thus relates to a standardized integrated-circuit contact card of the type having a support in the form of a rectangular plate delimited by two long longitudinal edges and two short transverse edges, front and rear, which carries at least one electronic microcircuit and whose reverse face has a series of contact areas, arranged close to the front transverse edge of the card, for the electrical connection of the microcircuit to an operating circuit belonging to a device having for example a connector in which the card is fitted so that its contact areas cooperate with contact blades on the connector, and of the type having a slot with a substantially rectangular contour formed in the support, around a portion including the microcircuit and the series of contact areas, in order to delimit a detachable standardized minicard which is connected to the card support by several lugs, produced in one piece with the support, which extend between the internal edges of the cutout formed by the slot in the card and the facing edges of the minicard which are roughly parallel to the edges of the card.

According to such a known design, which is for example illustrated in the document EP-B1-0.521.778, it is possible to simply transform the card, or a large card known as an SIM card, whose format is in accordance with the international standards GSM 11.11 and ISO 7816, into a standardized mini SIM card, whose dimensions are also defined by the international standard GSM 11.11, by detaching the latter from the card by breaking the lugs or connecting bridges, this rupture being able to be effected notably manually by pressing the minicard overall in a vertical direction perpendicular to the overall plane of the card.

This known design makes it possible to supply the card "complete" to a user, that is to say of course without detaching the minicard, to enable him to use the chip with a card in one or other of the two formats (card or minicard) according to the receiving apparatus in which he has to insert the card.

The product manufactured and supplied to the users must, in addition to the standards mentioned above defining the design and geometry of the two types of card, comply with other parameters and requirements.

Each of the two cards must in particular be able to meet, in accordance with the ISO standard, mechanical strength tests including notably repeated bending/torsion cycles, without there being any visual or functional degradation of the chip, the module incorporating the chip and inserted in the card support, or the plastic body of the card forming the support proper.

These mechanical constraints must in particular be withstood by the large card, as well as of course by the minicard.

For practical reasons, it is desirable for the minicard to be able to be detached easily from the body of the large card by a manual operation, without using any specific tool and without impairing the functioning and subsequent reliability of the minicard thus obtained.

It is desirable to improve the structure of the card in order in particular to facilitate still further the manual separation, whilst guaranteeing resistance to bending/torsion in accordance with the ISO standard.

Provision is for example made for the use of more fragile chips or modules in the future and, in this case, it is preferable not to have any risks, even insignificant, of damaging the chip or module.

In addition, one or the other of the two cards must be able to be used without presenting problems of insertion or extraction of the card into or from its receiving device, and particularly in the connector, more particularly when a card is introduced into the connector in a direction substantially parallel to its overall plane with its transverse insertion edge corresponding, in the case of the large card, to its front transverse edge adjacent to the contact areas for connection of the chip and, in the case of the minicard, to one or other of its two parallel opposite transverse edges.

It is also desirable, in particular when the large-format card is used, for the cutout slot, and/or complementary grooves constituting incipient breaks in the connecting lugs, not to damage the elastic contact blades of the connector because of its repeated passage opposite the free contact ends of the contact blades of the connector during repeated operations of inserting and extracting the card.

SUMMARY OF THE INVENTION

In order to remedy the drawbacks which have just been mentioned and to satisfy the different requirements for reliability of the cards and connectors, the invention proposes a card of the type mentioned above, characterized in that each lug has two types of groove opposite each other, shaped so as to be sufficiently resistant to bending/torsion forces in accordance with a standard, one of the grooves however also being shaped so as to more easily initiate a crack by intentional manual pressure on the minicard.

According to other characteristics of the invention:
the card has three connecting lugs including a first lug extending longitudinally from the front transverse edge of the minicard adjacent to the front transverse edge of the card, whose width is at least equal to the width of the series of contact areas arranged close to the front transverse edge of the minicard, and opposing second and third lugs which each extend transversely from a longitudinal edge of the minicard,
the second and third lugs are aligned transversely and are situated close to the series of contact areas;
the second and third aligned lugs are situated approximately 17 mm from the transverse edge of the minicard from which the first lug extends;
the width of the first lug is approximately 11 mm;
the width of the second and third lugs is approximately 1.2 mm;
each of the lugs has, at least on its front face or reverse face, a groove parallel to the edge of the minicard from which the lug extends so as to constitute a portion with a reduced thickness constituting an incipient break in the lug;
the first lug has, at least on its front face or reverse face, a groove which, in cross-section, has a V-shaped profile, one leg of which, adjacent to the edge of the minicard, extends perpendicularly to the overall plane of the card;

the first lug has two identical aligned opposing grooves formed in the front face and reverse face;

each of the second and third lugs has, at least on its front face or reverse face, a groove which, in cross-section, has a V-shaped profile, one leg of which, adjacent to the edge of the minicard, extends perpendicularly to the overall plane of the card;

each of the second and third lugs has, at least on its front face or reverse face, a groove which, in cross-section, has a profile substantially in the shape of a trapezium, one edge of which, adjacent to the edge of the minicard, extends perpendicularly to the overall plane of the card and whose small base, belonging to the bottom of the groove, lies with an inclination with respect to the overall plane of the card;

each of the second and third lugs has two opposing aligned grooves, on its front face a V-shaped groove and on its reverse face a groove substantially in the shape of a trapezium.

BRIEF DESCRIPTION OF THE DRAWINGS

Other characteristics and advantages of the invention will emerge from a reading of the following detailed description, for an understanding of which reference will be made to the accompanying drawings, in which:

FIG. 2 is a view similar to that of FIG. 1 on which the part of the card including the minicard has been depicted to a larger scale;

FIGS. 3 and 4 are views in section along the lines 3—3 and 4—4 in FIG. 2;

FIG. 5 is a view to a larger scale of the detail D5 in FIG. 3;

FIG. 6 is a partial view in cross-section along the line 6—6 in FIG. 5;

FIG. 7 is a view to a larger scale of the detail D7 in FIG. 4;

FIG. 8 is a partial view in cross-section along the line 8—8 in FIG. 7;

FIG. 9 is a plan view of another card according to the teachings of the invention;

FIG. 10 is a partial view in cross-section along the line 10—10 in FIG. 9;

DETAILED DESCRIPTION

Figure 11:
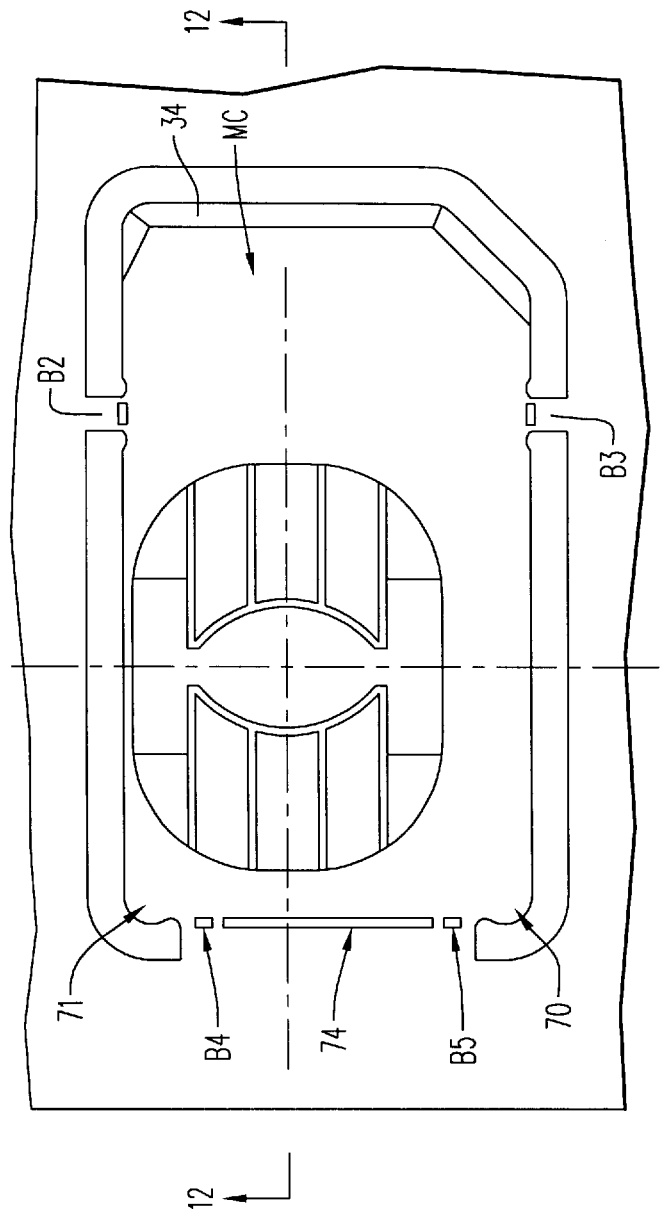
FIG. 11 is a plan view of another card according to the teachings of the invention.
Figure 12:
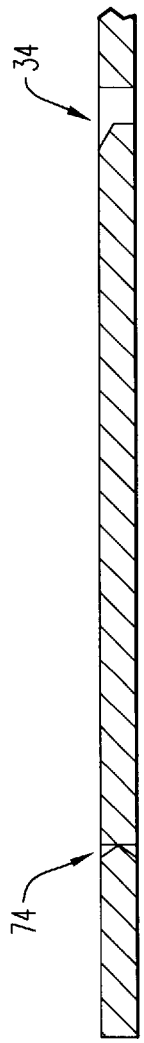

FIG. 12 is a partial view in cross-section along the line 12—12 in FIG. 11.

Figure 1:
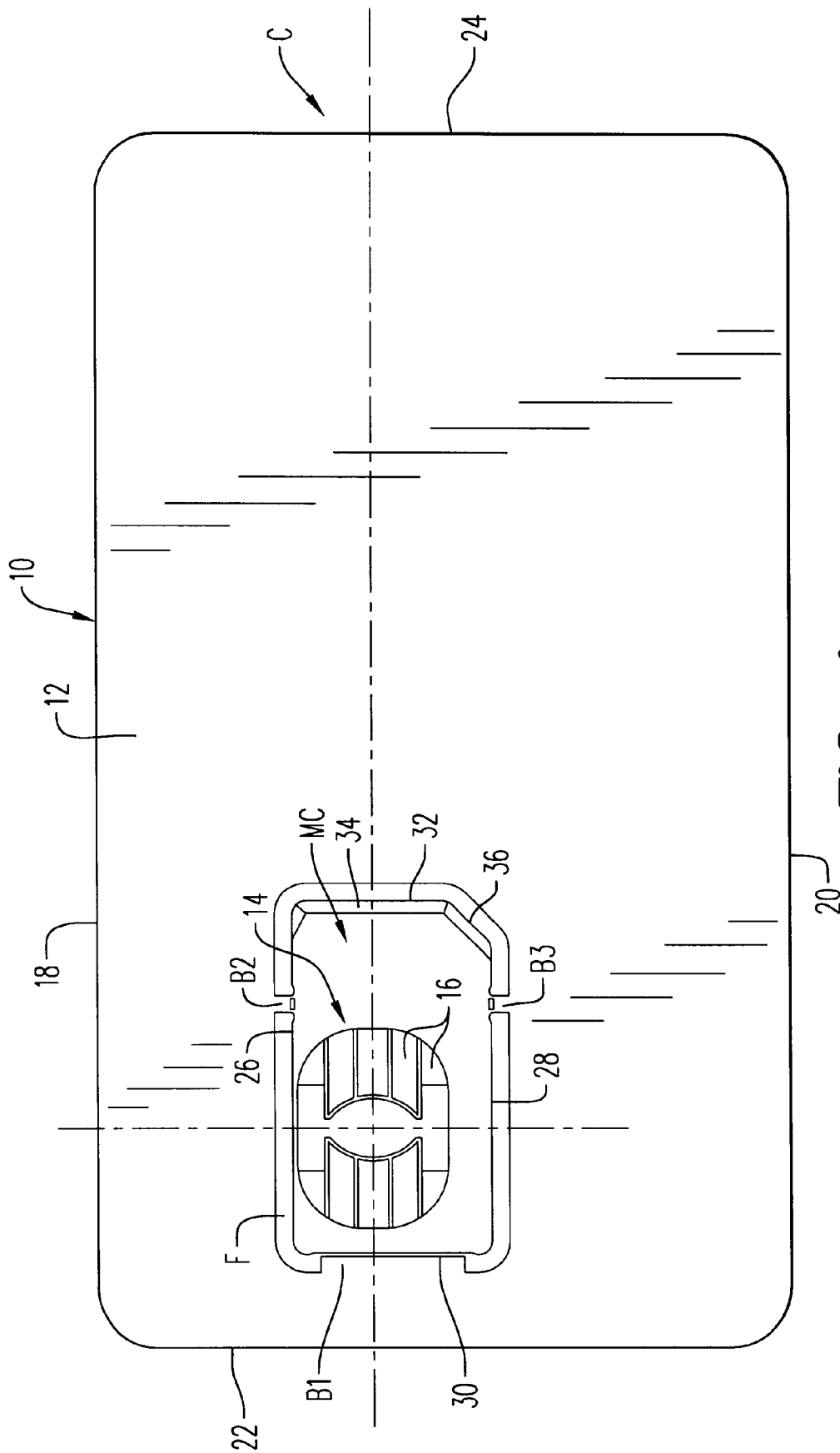
FIG. 1 is a plan view of a card according to the teachings of the invention.

FIG. 1 depicts a standardized card C, of a known general design, which is a smart card consisting essentially of a body 10 in the form of a rectangular sheet with rounded corners, which is generally made from plastics material and which incorporates an electronic microcircuit (not shown) associated with the support 10 in accordance with any one of the known techniques, for example in the form of a module plugged into the support 10.

The face 12 of the card C visible in FIG. 1 is the front face of the card, which has a zone 14 in which six or eight areas 16, or pins, are arranged for the electrical connection of the electronic microcircuit to an operating circuit by means of an electrical connector (not shown) belonging for example to a read-write device.

The areas 16 are disposed in a standardized design and extend roughly parallel to each other and aligned in pairs in the general longitudinal direction of the card, that is to say in the direction parallel to the two parallel opposing longitudinal edges 18 and 20 of the support 10.

In accordance with the standard, the zone 14 including the series of areas 16 is arranged close to a transverse edge 22 of the support 10, which is referred to here as the front transverse edge with reference to the normal direction of insertion of the card C, from rear to front, into a connector.

The support 10 is also delimited by an opposite rear transverse edge 24 parallel to the front transverse edge 22 and perpendicular to the two longitudinal edges 18 and 20.

The other face 13 forming the reverse face of the card (see FIG. 3) is parallel to the front face 12, these two faces determining the standardized thickness of the card C, which is between 0.68 and 0.84 mm and preferably between 0.80 and 0.84 mm.

According to a known design, the support 10 has a slot F with a substantially rectangular contour and which extends roughly around a portion of the body 10 of the card C which includes the electronic microcircuit and the zone 14 including the series of electrical connection areas 16.

The slot F thus delimits on the inside a standardized minicard MC with a substantially rectangular contour, which is delimited by two parallel and opposite longitudinal edges 26 and 28 which are respectively parallel and adjacent to the longitudinal edges 18 and 20 of the card C.

The minicard MC is also delimited by a first transverse edge 30, here referred to as the front transverse edge, which is parallel and adjacent to the front transverse edge 22 of the card C.

Finally, the minicard MC is also delimited by another rear transverse edge 32 opposite and parallel to the front transverse edge 30, which is an edge having a chamfer 34 formed in the front face 12 of the support 10 and which is connected to the longitudinal edge 28 by a cant 36, with standardized shape and dimensions, in order to constitute a means of determining the direction of insertion or fitting of the minicard MC in a connector.

The function of the chamfer is to prevent any catching of the minicard against the components of a mobile telephone, when it is being removed from it. This is because some mobiles have elastic means which have a tendency to press the minicard against the connector and to lift the end 32 of the minicard out of the overall plane of the card. The chamfer can be produced by compressing the material of the card by means of an appropriate tool.

The slot F can be produced according to a known technique, using for example a cutting tool/punch and a complementary die, or by producing it by cutting by means of a pressurized water jet or a laser beam.

The cutting of the slot F is incomplete, that is to say, according to a known general design, lugs or bridges are left which connect the minicard MC to the body 10 of the card C in order to constitute a "bi-standard" assembly enabling the end user to use the large-format card C or the minicard MC, according to the application, such an option being in particular necessary when the card contains data relating to a subscription to a telephone communication network to which connection is made by portable handsets which, according to the manufacturer, use the two types of card.

The connecting lugs are produced in one piece, that is to say they are formed from portions of the support 10 which are not cut when the slot F is produced.

In accordance with the teachings of the invention, the connecting lugs are three in number and are distributed in an arrangement which will now be described in more detail, notably with reference to FIG. 2.

The first lug B1 extends longitudinally, towards the left looking at FIG. 2, from the front transverse edge 30 of the minicard MC which is adjacent to the zone 14, in the direction of the front transverse edge 22 of the card C.

In accordance with the teachings of the invention, the first lug B1 is a lug of great width L1, for example approximately 11 mm, which is greater than the width L2 representing the width and passage of the contact blades of a connector with respect to the zone 14 carrying the electrical connection areas 16. In addition, the lug B1 extends at least opposite this zone so that there is no portion of slot F between the front transverse edge 22 of the card C and the zone 14 in order to prevent damaging the contacts of a connector by the passage of a portion of slot F over the free ends of the contact of the connector.

In addition, the first lug B1 of great width L1 confers mechanical properties on the card C and on the minicard MC enabling them to resist, in association with the other lugs, the torsion and bending forces mentioned previously.

The other two lugs for connecting the minicard MC to the card C are, in the embodiment illustrated in the figures, two identical and opposite lugs B2 and B3.

The first lug B2 extends transversely from the longitudinal edge 26 of the minicard MC in the direction of the longitudinal edge 18 of the card C.

In the same way, the third lug B3 extends transversely from the longitudinal edge of the minicard MC in the direction of the longitudinal edge 20 of the card C.

The second and third lugs B2 and B3 are aligned in the same transverse direction and are situated close to the zone 14, that is to say their mean transverse axis, corresponding to the section line 4—4 of FIG. 2, is situated at a distance from the front transverse edge 30 of the minicard MC of approximately 17 mm.

In accordance with the teachings of the invention, there is no other connecting lug, and there is in particular no connecting lug extending from the rear transverse edge 32 of the minicard MC to connect it to the support 10 of the card C, which is particularly advantageous in so far as this edge often constitutes the edge for insertion of the minicard into a connector, which thus has no burr which might impair correct positioning of the minicard with respect to the connector and might damage the contact blades on the latter.

As can be seen in particular in FIG. 2, the second and third lugs B2 and B3 are lugs with a reduced width L3, which is for example approximately 1.2 mm.

In the example illustrated in the Figures, the three lugs B1 to B3 are lugs each delimited by two parallel and opposite edges, of longitudinal orientation in the case of the first lug B1, and of transverse orientation in the case of the second and third lugs B2 and B3.

According to another aspect of the invention, means are provided for facilitating the breaking of the connecting lugs by manual operation with a view to detaching the minicard MC from the card C.

In accordance with the invention, the means constituting incipient breaks for the connecting lugs are grooves with particular profiles and dimensions.

With regard to the first lug B1, the front face 12 and reverse face 13 of the lug each have a groove 40, 42 which are opposite and aligned and each of which is shaped in cross-section, as can be seen in particular in FIGS. 3 and 5, with a substantially V-shaped profile.

More particularly, each groove 40, 42 has a vertical arm or edge 44, 46 which extends vertically perpendicular to the plane of the front face 12 and reverse face 13, whilst the other edges or arms 48 and 49 are inclined in the direction of the card C, forming an acute angle with the edge 44, 46, for example of approximately 300. The depths of the grooves 40 and 42 are preferably equal but they could be different and for example equal respectively to 0.42 and 0.30 mm in the case of a 0.82 mm thick card. Preferably, the apex of the groove is broken by a flat with a width of approximately 0.02 mm or in a substantially equivalent manner by a rounded part with a radius of curvature of approximately 0.01 mm. The residual section between the grooves depends on the thickness of the card and the nature of the material making up the support. The above values are given for a card made of injection-moulded ABS or ABS-HR (high temperature) and correspond to a residual section of approximately 0.10 mm. These values would however be substantially valid for cards obtained from another injection moulded material and with similar mechanical properties.

The grooves are produced by marking by means of a punch (not depicted in the figures) whose depth of penetration determines the depth of the grooves.

As can be seen in particular in FIG. 2, the grooves forming an incipient break 40 and 42 extend over the entire width L1 of the lug 91.

A description will now be given of the grooves forming an incipient break for the second and third lugs B2 and B3.

In the example illustrated in the figures, the grooves 50 formed in the front face 12 of the lugs B2 and B3 are not identical to the grooves 52 formed in the reverse face 13. They are on the other hand identical in pairs, that is to say the two grooves 50 formed in the front face 12 are identical, just like the two grooves 52 formed in the reverse face 13.

As can be seen in particular in FIG. 2, the width of the grooves 50 is less than the total width L3 of the first and second lugs B2 and 33. The same applies to the width of the grooves 52.

The grooves 52 forming an incipient break which are formed in the rear face 13 are of a similar design to the grooves 40 and 42 formed in the first lug B1, that is to say each has a profile substantially in a V shape with an edge 54 perpendicular to the overall plane of the card C and an inclined edge 56. The angle of the V is here for example 25° and the depth of the grooves 52 is 0.10 mm. The grooves preferably have a rounded corner at their end (at the apex of the V). By virtue of this rounded part, the initiation and propagation of cracks during the bending and torsion tests in accordance with the aforementioned ISO standard are limited. This 15 rounded part has in the example in particular a radius of curvature of around 0.01 mm.

On the other hand, the groove is sufficiently profiled to permit an incipient break by an intentional manual pressure acting on the minicard in the direction in particular from the front face to the reverse face.

The grooves 50 have a different profile substantially in the shape of a trapezium, illustrated notably in FIG. 7.

Thus each groove 50 is delimited by a base 58 slightly inclined with respect to the front face 12 and to the overall plane of the card C, for example by an angle of 10°, which corresponds to the small base 58 of the trapezium, the latter also being delimited by a large side 60, aligned with the edge 54 of the groove 52 opposite, which extends perpendicularly to the plane of the front face 12 and to the overall plane of the large card and, on the other hand, by a small side 62 which is inclined, the first side 60 being adjacent to the minicard MC whilst the inclined (or rather slightly rounded) side 62 extends in the direction of the body of the card C. The sides 60 and 62 are connected to the base 58 by fillets with a radius of approximately 0.05 mm. As can be seen in FIG. 8, the grooves 52 and 50 have a width L4 which is for example equal to 0.40 mm whilst the width L3 of the lugs B2 and B3 is equal to approximately 1.2 mm. The width of the groove 50 for its part is equal to approximately 0.22 mm.

This groove is shaped so as to resist the bending/torsion forces imposed by the aforementioned ISO standard, and this more so than the groove 52. This is because its rounded and open shape is more resistant to the initiation of a crack than that of the groove 52, which has an acute shape and ends in a small radius of curvature of for example 0.01 mm, as opposed to the groove 50 whose deepest end has for example a radius of curvature greater than 0.05 mm.

The presence of a radius of curvature at the end of the groove 52 is particularly justified in order to attenuate the tendency of this groove to initiate a crack during bending/torsion tests.

A slight inclination of the base 58 of the groove 50, for example of 10 degrees, creates a zone situated closest to the end of the groove 52. In this way a zone 69 where a crack is initiated or arrives is obtained, facilitating the breaking of the lug along a line joining the edges 60 and 54.

Likewise, it can be seen in FIG. 8 that the groove 50 is more splayed than the groove 52, this again for the purpose of being less sensitive to an incipient crack compared with the groove 52.

Thus according to the invention the card is characterized in that it has lugs for connecting the minicard to the large card with a particular shape, each lug having two types of grooves opposite each other formed so as to be sufficiently resistant to the bending/torsion forces according to the ISO standard, one of the grooves however also being formed so as more easily to initiate a crack by intentional manual pressure on the minicard. Thus, if needed, the manual effecting of the breaking is controlled as close as possible to the minicard, whilst complying with the standardized contour of the minicard.

Where necessary, it is possible to have a single lug of this type connecting the minicard to the large card and sized so as to fulfill the mechanical function of several lugs.

Where the removal of the minicard is not required, it is possible to have a large-format card in accordance with the ISO standard both with regard to the dimensions and the properties of mechanical strength.

In accordance with another embodiment illustrated in FIG. 9, the lug B1 is produced as two lugs B4, B5 spaced apart, situated notably close to the corners 70, 71 of the minicard. These lugs can have grooves whose cross-section is substantially in accordance with that of the lug B1 (FIG. 5).

The advantage of a construction with two lugs is to make it possible to keep the minicard substantially in one plane in spite of a curvature of the card in its width. In this way a probable tendency of the lug B1 to have an incipient crack from the corners 70, 71 is avoided.

It is however preferred to have lugs B4, B5 in conformity with the lugs B2, B3 in order to increase the resistance to the bending/torsion forces.

Alternatively, in order to have the least deformation on the minicard, it may be envisaged having a single lug with a structure substantially in accordance in particular with that of B1 but less wide, and centered on the longitudinal median of the minicard. Preferably this central lug can be in accordance with B4, B5 and sized so as to fulfil the required function.

The additional function of the lug B1, which is to facilitate the passage of resilient connector blades, can be achieved in two other different ways.

The first is illustrated in FIGS. 9 and 10, by chamfers which attenuate the discontinuity caused by the slot F. The chamfers are provided at the level of the passage of these resilient blades in the case of significant discontinuity. In the example, a chamfer (72, 73) is provided respectively on each side of the slot F.

As a variant, the above function is achieved in accordance with FIGS. 11 and 12. Between the two lugs B4, B5 there is a slot 74 passing through the card equivalent to the slot F but narrower. It can result from a shearing operation effected by blades or by punch and die.

Also as a variant, the slot F can be produced in accordance with the notch 74 in FIG. 12 over the entire contour of the minicard with the exception of the lugs.

The invention is not limited to the embodiment which has just been described.

Without departing from the scope of the invention, but preserving the principle of the invention, it is of course possible to modify the dimensions, position and number of the different lugs slightly, as well as the profiles and dimensions of the grooves.

In all cases, the design in accordance with the teachings of the invention makes it possible to meet the criteria of mechanical strength of the card without separation of the minicard, permits manual separation of the minicard MC without leaving any harmful burrs, and makes it possible to prevent premature wear on the connectors in particular when it is the large card as a whole which is used.

What is claimed is:

1. A standardized integrated-circuit contact card having a support in the form of a rectangular plate delimited by two long longitudinal edges and two short front and rear transverse edges, which carries at least one electronic microcircuit and whose face has a series of contact areas arranged close to the front transverse edge of the card, for the electrical connection of the microcircuit to an operating circuit, and a slot with a substantially rectangular contour formed in the support, around a portion including the microcircuit and the series of contact areas, in order to delimit a detachable standardized minicard which is connected to the support of the card by a plurality of lugs integral with the support which extend between the internal edges the cutout formed by the slot in the card and facing edges of the minicard which are roughly parallel to the edges of the card, wherein each lug has two types of groove opposite each other, shaped so as to be sufficiently resistant to bending/torsion forces in accordance with a standard, one of the grooves being shaped so as to more easily initiate a crack by intentional manual pressure on the minicard.

2. A card according to claim 1, having three connecting lugs including a first lug extending longitudinally from the front transverse edge of the minicard adjacent to the front transverse edge of the card whose width is at least equal to the width of the series of contact areas arranged close to the front transverse edge of the minicard and opposing second and third lugs which each extend transversely from a longitudinal edge of the minicard.

3. A card according to claim 2, wherein the second and third lugs are aligned transversely and are situated close to the series of contact areas.

4. A card according to claim 3, wherein the second and third aligned lugs are situated approximately 17 mm from said transverse edge of the minicard from which the first lug extends.

5. A card according to claim 2, wherein the width of the first lug is approximately 11 mm.

6. A card according to claim 5, wherein the width of the second and third lugs is approximately 1.2 mm.

7. A card according to claim 2, wherein each of the lugs has, at least on one face thereof a groove parallel to the edge of the minicard from which the lug extends so as to constitute a portion with a reduced thickness constituting an incipient break in the lug.

8. A card according to claim 7, wherein the first lug has, at least on one face thereof a groove which, in cross-section, has a V-shaped profile, one leg of which, adjacent to the front transverse edge of the minicard extends perpendicularly to the overall plane of the card.

9. A card according to claim 8, wherein the first lug has two identical aligned opposing grooves formed in the front face and reverse face of the card.

10. A card according to claim 7, wherein each of the second and third lugs has, at least on one face thereof, a groove which, in cross-section, has a V-shaped profile, one leg of which, adjacent to an edge of the minicard extends perpendicularly to the overall plane of the card.

11. A card according to claim 7, wherein each of the second and third lugs has, at least on one face thereof a groove which, in cross-section, has a profile substantially in the shape of a trapezium, one edge of which, adjacent to an edge of the minicard extends perpendicularly to the overall plane of the card and whose small base, belonging to the bottom of the groove, is oriented at an inclination with respect to the overall plane of the card.

12. A card according to claim 13, wherein each of the second and third lugs has two opposing aligned grooves, on its front face a V-shaped groove and on its reverse face a groove substantially in the shape of a trapezium.

13. A card according to claim 10, wherein each of the second and third lugs has, at least on one face thereof, a groove which, in cross-section, has a profile substantially in the shape of a trapezium, one edge of which, adjacent to an edge of the minicard, extends perpendicularly to the overall plane of the card and whose small base, belonging to the bottom of the groove, is oriented at an inclination with respect to the overall plane of the card.

14. A card according to claim 2, wherein the width of the second and third lugs is approximately 1.2 mm.

15. A standardized integrated-circuit contact card having a support in the form of a rectangular plate which carries at least one electronic microcircuit, a series of contact areas on one face of the support at a location close to one of the edges of the card for the electrical connection of the microcircuit to an operating circuit, a slot formed in the support, around a portion including the microcircuit and the series of contact areas to delimit a detachable standardized minicard, a first lug extending longitudinally parallel to said one edge of the card between the internal edge of the cutout formed by the slot in the card and the facing edge of the minicard, and having a width that is at least equal to the width of the series of contact areas, and opposing second and third lugs which each extend transversely from a longitudinal edge of the minicard.

16. A card according to claim 15, wherein the second and third lugs are aligned transversely and are situated close to the series of contact areas.

17. A card according to claim 16, wherein the second and third aligned lugs are situated approximately 17 mm from the said transverse edge of the minicard from which the first lug extends.

18. A card according to claim 15, wherein the width of the first lug is approximately 11 mm.

19. A card according to claim 18, wherein the width of the second and third lugs is approximately 1.2 mm.

20. A card according to claim 15, wherein each of the lugs has, at least on one face thereof, a groove parallel to the edge of the minicard from which the lug extends so as to constitute a portion with a reduced thickness constituting an incipient break in the lug.

21. A card according to claim 20, wherein the first lug has, at least on one face thereof, a groove which, in cross-section, has a V-shaped profile, one leg of which, adjacent to the front transverse edge of the minicard, extends perpendicularly to the overall plane of the card.

22. A card according to claim 20, wherein each of the second and third lugs has, at least on one face thereof, a groove which, in cross-section, has a V-shaped profile, one leg of which, adjacent to an edge of the minicard, extends perpendicularly to the overall plane of the card.

23. A card according to claim 20, wherein each of the second and third lugs has, at least on one face thereof, a groove which, in cross-section, has a profile substantially in the shape of a trapezium, one edge of which, adjacent to an edge of the minicard, extends perpendicularly to the overall plane of the card and whose small base, belonging to the bottom of the groove, is oriented at an inclination with respect to the overall plane of the card.

24. A card according to claim 15, wherein the first, second, and third lugs are formed integrally with the support and with at least a portion of the detachable standardized minicard.

25. A card according to claim 15, wherein the first lug is located at a transverse edge of the minicard, and the opposed second and third lugs are located at opposed longitudinal edges of the minicard.

\* \* \* \* \*